US00RE34134E

United States Patent [19]

Medlen et al.

[11] E Patent Number: Re. 34,134

[45] Reissued Date of Patent: Dec. 1, 1992

[54] TYPE SEGMENT FOR PRINTING ROLL

[75] Inventors: Lester R. Medlen; James J. Nichols, both of Fort Wayne, Ind.

[73] Assignee: Porelon, Inc., Cookeville, Tenn.

[21] Appl. No.: 380,207

[22] Filed: Jul. 14, 1989

Related U.S. Patent Documents

Reissue of:

[64] Patent No.: 4,729,313
Issued: Mar. 8, 1988
Appl. No.: 799,003
Filed: Nov. 18, 1985

[51] Int. Cl.[5] ..... B41B 1/02

[52] U.S. Cl. ..... 101/380; 101/36; 101/376; 101/384; 101/396

[58] Field of Search ..... 101/35, 36, 37, 375, 101/376, 379, 380, 384, 396, 395

[56] References Cited

U.S. PATENT DOCUMENTS

| | | | |
|---|---|---|---|
| 528,583 | 11/1884 | Arnold et al. | 101/379 |
| 605,945 | 6/1988 | Blackmore | 101/379 |
| 828,704 | 8/1906 | Blackmore | 101/381 |
| 975,344 | 11/1910 | Folger | 101/380 |
| 1,442,338 | 1/1923 | Herr | 101/395 |
| 1,580,010 | 4/1926 | Buck | 101/375 |
| 1,606,190 | 11/1926 | Sharp | 101/375 |
| 1,611,679 | 12/1926 | Rees | 101/396 X |
| 1,796,741 | 3/1931 | Ackerman | 101/376 |
| 1,869,868 | 8/1932 | Selden | 101/379 |
| 2,234,726 | 3/1941 | Frazier | 101/384 |
| 2,603,267 | 7/1952 | Simpson | 101/376 |
| 2,987,995 | 6/1961 | Mahoney | 101/376 |
| 3,109,368 | 11/1963 | Luttrell | 101/376 |
| 3,230,880 | 1/1966 | Beaver | 101/380 |
| 3,253,323 | 5/1966 | Saueressig | 101/375 |
| 3,295,188 | 1/1967 | Saueressig | 101/375 |
| 3,425,347 | 2/1969 | Nard | 101/376 |
| 3,968,747 | 7/1976 | Johnson | 101/376 |
| 4,239,002 | 12/1980 | Rosenstein | 101/376 X |
| 4,403,548 | 9/1983 | Faller | 101/372 |

*Primary Examiner*—Edgar S. Burr
*Assistant Examiner*—Joseph R. Keating
*Attorney, Agent, or Firm*—Foley & Lardner

[57] ABSTRACT

A flexible type segment formed of elastomeric material and in an initially flat condition, and adapted for mounting on the cylindrical surface of a printing roll that engages the surface of an object to be marked, and prints indicia thereon. The segment has an elongated base with generally flat, parallel top and bottom surfaces and a raised panel print face formed on the top surface. The print face defines indicia to be inked and thereafter to apply an ink imprint to the respective surface to be marked. A plurality of recesses are formed in the bottom surface of the base, the recesses extending into the material a major portion of the depth of the base. The recesses reduce the section of the base so that flexing of the segment when it is mounted on the roll and force variations between the print face and the surface to be marked produce a minimum of distortion of the print face.

13 Claims, 1 Drawing Sheet

TYPE SEGMENT FOR PRINTING ROLL

Matter enclosed in heavy brackets [ ] appears in the original patent but forms no part of this reissue specification; matter printed in italics indicates the additions made by reissue.

BACKGROUND OF THE INVENTION

This invention relates to printing apparatus, and especially to roller-type printing devices employing type segments formed of resilient material such as rubber for applying various indicia to flat, irregular or uneven surfaces. More particularly, the invention relates to an improved type segment comprising an elongated, flexible strip with a print face molded therein and adapted to be maintained on a curved, generally cylindrical surface, such as on a printing roll.

In the manufacture of packaged goods, certain marking, such as date codes, names, coded identifiers, and the like, are printed on the packages as they are being conveyed at a high rate of speed. Such packaging may be of metal, plastic, or cardboard, for example, and in many instances the marking must be printed on uneven and irregular surfaces.

One type of package and product marking that has just recently come into widespread use is the bar code, which comprises a series of parallel lines or bars of varying width and spacing, containing coded information that can be read by an optical device. These codes must be printed very accurately and without variations in the predetermined incremental dimensions. Obviously, the printing device must be capable of accurate marking regardless of variations in the shape, etc. of the surface to be marked.

The type segments conventionally used are formed or molded of relatively soft elastic material, such as rubber, such that the force of the type imprint can determine the clarity of the marking. If too forceful, the type distorts and produces an unclear print or smudge. If not forceful enough, the marking is not clear enough to be read, and in the case of bar codes is not of sufficient clarity to be processed by an optical reader.

Elongated type segments of elastomeric material usually carry a sequence of letters or numbers seriatim or a bar code of the type described. If the surface to be marked is irregular, the segment must essentially conform to such irregularities, or else some portion or portions of the surface will not be imprinted while others will be smeared.

Various printing wheel devices and elongated elastomeric strips forming type segments have been employed to make clear ink imprints at high speeds, certain of these being the subject of U.S. Pat. Nos. 3,071,071; 3,093,070; 3,230,880; 3,327,624; 3,968,747; and 4,129,074.

Such devices in various respects rely on the yieldability of the type segment to secure a thoroughly uniform imprinting force of all the type elements on an irregular surface being marked. However, if the type segment is not sufficiently yieldable at a high point on the surface, undue force can occur, causing a distorted or smeared mark.

The problems described above are particularly applicable in printing boxboard cartons. In addition to the variations in positioning of the printing roller and the surface of the carton to be marked, other variations occur as a result of the different amounts of support that the carton and its contents provide for the surface. For any combination of ink, type, and carton surface to be marked, there is a range of unit pressure in the zone of contact that works best. Accordingly, the type segment must be designed to compensate for a wide range of carton-surface error while maintaining a nearly uniform type face printing pressure. With such nearly uniform pressure, distortion of the type face will be minimized.

Prior art attempts to meet the requirements described above have included: (1) rubber type that is obviously more resilient than metal type and permits the use of greater marking force; (2) rubber type with a relief in the base of the type holder that permits the type segment to flex as a simply supported beam (e.g., U.S. Pat. No. 3,071,071); and (3) the use of low durometer elastomeric material with a deep section.

All of these prior art techniques, however, have certain deficiencies. Because rubber-type segments, for economic reasons, must be molded flat, the segment will be distorted when flexed to comply with the cylindrical surface of the printing roll. With reference to beam theory, when the segment is flex within its proportional limits, there are surface strains, both compressive and tensile, as a function of the distance between the neutral axis of the section and the radius of curvature. For any given roll diameter, the deeper the type, the more the distortion of the type face.

While Poisson's ratio will cause some distortion in the axial direction, the principal distortion will be in the circumferential direction.

The spring rate of a simple bar in tension is represented by the equation:

$$K = A \times \frac{E}{L}$$

where A is the area under load, L is the length of the section under load, and E is the modulus of elasticity (Young's modulus) of the material. From this equation, it follows that for optimum performance, the type segment should be as deep as possible (i.e., should have a large L) for a given type face area, and the neutral axis of the type segment should be as close to the printing face as possible. This would reduce the distortion at the type face at the expense of distortion at the base or support side, which would not be objectionable.

The type segment construction of the present invention satisfies the requirement described above, and affords other features and advantages heretofore not obtainable.

SUMMARY OF THE INVENTION

It is among the objects of the present invention to provide a type segment to be placed on a cylindrical roller that is capable of accommodating variations and irregularities in the surface of the object to be marked.

Another object of the invention is to reduce the distortion of the type face of an elongated, flexible type segment due to variations in the printing force.

Still another object is to reduce distortion in the type face of a flat, flexible type segment when the segment is flexed to conform to the cylindrical surface of a printing roll.

These and other objects and advantages are achieved by the unique type segment construction of the invention, wherein the segment is a generally flat strip formed of resilient elastomeric material and is adapted for mounting on the cylindrical surface of a printing roll that moves relative to an object (e.g. package) to be marked and makes rolling engagement therewith to print indicia thereon. The segment includes an elongated base having flat, parallel top and bottom surfaces and an upwardly facing print face. The print face defines indicia (such as a bar code) to be inked by an ink roll and thereafter to transfer the ink in the predetermined printed pattern on a surface when the printing segment is rolled against the object to be marked.

In accordance with the invention, the base has a plurality of cavities formed in its bottom surface, which extend upwardly a substantial part of the overall depth of the base. Accordingly, when the type segment is flexed about a center of curvature to conform to the cylindrical surface of the roll, distortion occurs primarily at the lower portion of the base, so that distortion of the print face is minimized. Also, when the type segment is pressed against the surface of the object to be printed, irregularities in pressure between the roll and the object will be accommodated by the base and distortion of the print face is minimized.

DESCRIPTION OF THE PREFERRED EMBODIMENT

Figure 1:
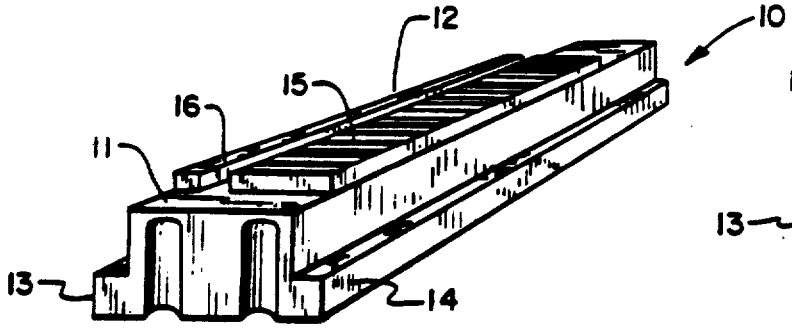
FIG. 1 is a perspective view showing a type segment embodying the invention and adapted to be flexed to conform to the cylindrical surface of a printing roll.
Figure 4:
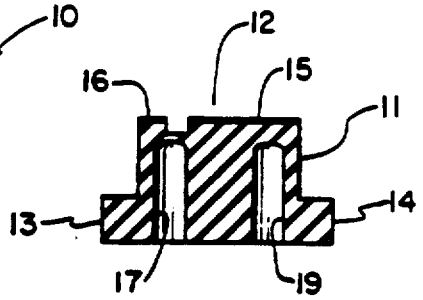
FIG. 4 is a sectional view, taken on the line 4—4 of FIG. 2.

Referring more particularly to the drawings, and initially to FIGS. 1 through 4, there is shown an elongated, molded type segment 10 formed of elastomeric material and adapted for use in printing certain indicia on articles such as packages moving at a fairly rapid rate of speed. The segment 10 has an elongated base 11 of a generally rectangular cross section and a raised print face 12 formed on the top surface thereof. Also, the base has a pair of laterally extending flanges 13 and 14 that are used for securing the type segment to the printing roll, such as in the manner shown and described in U.S. Pat. Nos. 3,071,071 and 3,230,880.

The raised print face 12 includes a bar code strip 15 comprising a series of parallel bars of varying width and spacing that contains coded indicia, and a numerical code strip 16 extending parallel to the strip 15 and containing a number code that can be easily read when printed on a surface.

Type segments of the type shown and described are molded of suitable resilient material, such as rubber, and a plurality of such segments may be provided in predetermined spaced, angular relationship on a printing roll.

Figure 3:
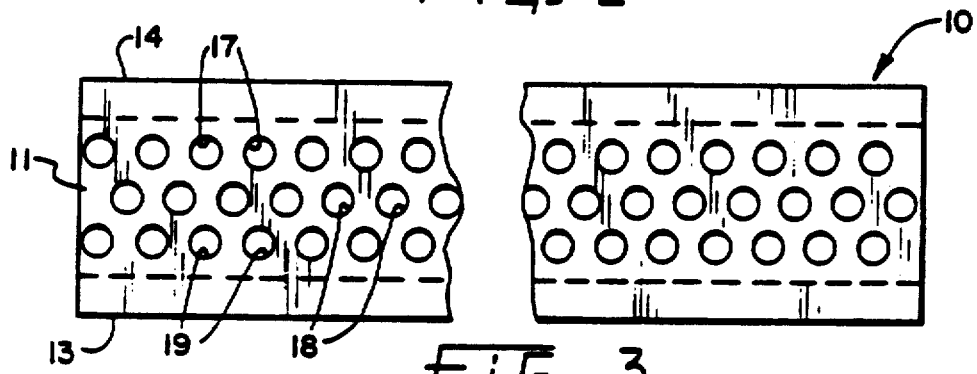
FIG. 3 is a bottom elevation of the type segment of FIGS. 1 and 2.

In accordance with the invention, the base 11 is provided with a matrix of recesses preferably molded therein and having an opening in the bottom surface, as illustrated in FIG. 3. The recesses are arranged in three rows 17, 18, and 19, the recesses of the rows 17 and 19 being staggered relative to the recesses of the row 18.

In the embodiment shown, the recesses of each of the three rows 17, 18, and 19 are equally spaced longitudinally from one another, and are all of equal size. Also, the longitudinal centerlines of the three rows are spaced such that the centerline of the row 18 is midway between the centerlines of the rows 17 and 19.

Figure 2:
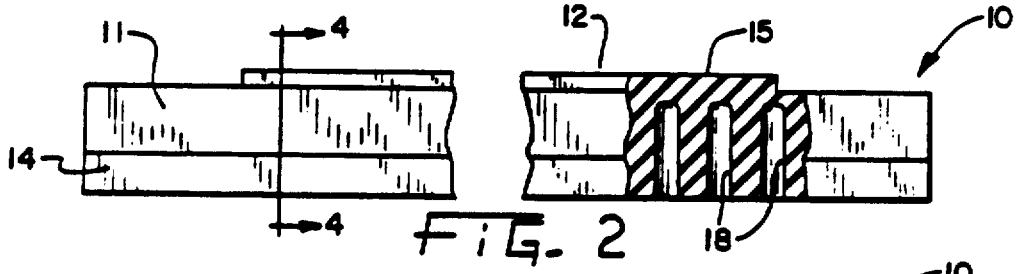
FIG. 2 is a broken side elevation of the type segment, with parts broken away and shown in section for the purpose of illustration.

The recesses extend quite deeply into the base, or, as viewed in FIG. 2, upwardly through the base approximately 90 percent of the total depth thereof. Also, the recesses are preferably arranged such that any lateral cross section through the base will intersect at least one of the recesses. The area of the recesses preferably comprises at least 50% of the area of the bottom surface that underlies the print face, and preferably between 50% and 70% of that area.

The purpose of the recesses is to reduce the section modulus, thereby allowing the type segment to be more easily bent to conform to the cylindrical surface of the roll, and to allow the neutral axis of the segment to be shifted more toward the type face. Since there is less area of material under the type face, the spring rate will be reduced proportionately. The shapes of the relief areas are not particularly critical, other than to maintain a uniform support for the type face.

Another advantage of this construction is that the mass of the type segment will be reduced. This will permit higher roll speeds due to the reduced centrifugal force.

Figure 5:
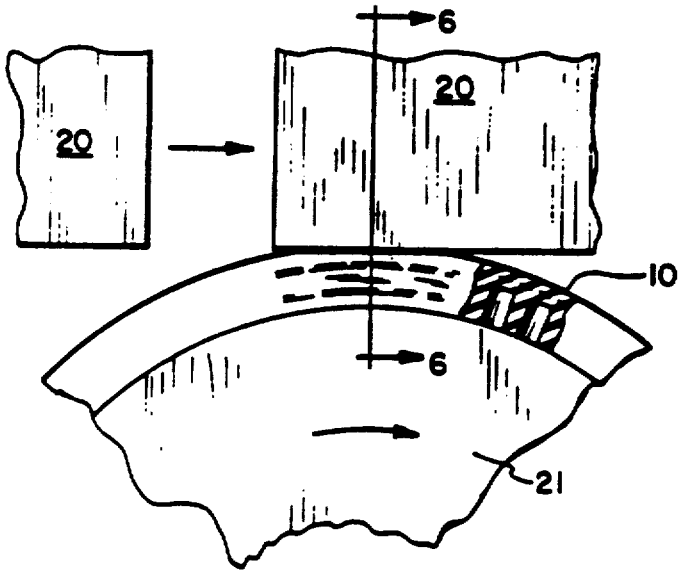
FIG. 5 is a fragmentary, elevational view, illustrating the type segment mounted on the cylindrical surface of the printing roll and adapted to engage the surfaces of boxboard cartons on which the indicia of the type segment are to be marked.
Figure 6:
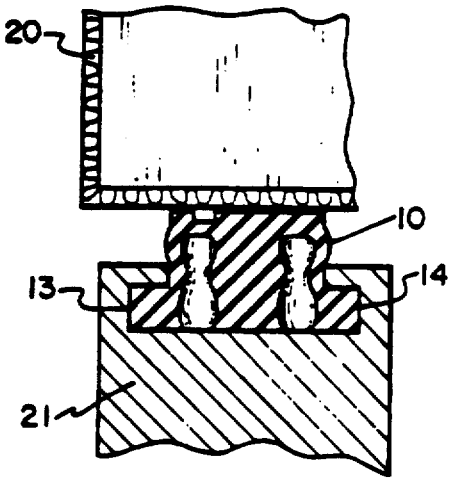
FIG. 6 is a fragmentary, sectional view, taken on the line 6—6 of FIG. 5.

FIGS. 5 and 6 illustrate the type segment 10 of the invention actually being used in a printing process. The device is being used to mark boxboard cartons 20, which are being conveyed in the direction indicated by the arrows at a relatively high rate of speed. The type segment 10 is mounted on a printing roll 21 which is located adjacent the path of travel of the boxboard cartons 20, and which is also used in association with an inking roll (not shown) that supplies ink to the type face. The printing roll 21 and associated ink roll may be, for example, part of the apparatus shown and described in U.S. Pat. No. 3,327,624. The segment 10 is only one of several segments which are mounted on the roll, each subtending a certain arc on the cylindrical mounting surface of the roll. Although the initially flat segment 10 is deformed as it is mounted on the cylindrical surface of the roll 21, the distortion occurs primarily in the base portion, with only minimal effect at the print face. This is achieved by the unique construction of the present invention utilizing the matrix of deep recesses in the base 11.

Also, the unique construction of the invention permits the type segment to accommodate a wide range of force variation in the contact force between the print face and the surface of the carton 20 to be marked.

FIG. 6 illustrates a typical situation where an irregularity in the surface of a carton 10 produces a relatively high contact force between the print face 12 and the surface of the carton. This force results in elastic flexing of the base 11; however, the flexing consists in a distortion of the material that produces an inward bulging of material into the recesses and some outward bulging of the side walls of the base. It will be seen that, because the elastic flexing is accommodated this way, there is relatively little, if any, distortion of the type face.

In the foregoing table, the dimensions of the working embodiment of the invention illustrated in FIGS. 1 through 4, are given by way of example only, and not by way of limitation.

| Description of Dimension | Dimension |
|---|---|
| Length of segment | 6 in. |
| Thickness of base | 7/16 in. |
| Width of base | $\frac{1}{2}$ in. |
| Overall width of base and flanges | $\frac{1}{4}$ in. |
| Height of print indicia | 1/16 in. |
| Depth of recesses | $\frac{3}{8}$ in. |

While the invention has been shown and described with respect to a particular embodiment thereof, this is for the purpose of illustration rather than limitation, and other variations and modifications of the specific embodiment herein shown and described will be apparent to those skilled in the art all within the intended spirit and scope of the invention. Accordingly, the patent is not to be limited in scope and effect to the specific embodiment herein shown and described nor in any other way that is inconsistent with the extent to which the progress in the art has been advanced by the invention.

What is claimed is:

1. A flexible type segment formed of elastomeric material in an initially flat condition, and adapted for mounting on the cylindrical surface of a printing roll that rolls about its axis against the surface of an object to be marked and prints indicia thereon, comprising:

an elongated base having generally flat, parallel top and bottom surfaces and being mounted on said roll with its bottom surface conforming to the cylindrical surface of the roll and extending longitudinally in a circumferential direction around the roll;

a raised print face formed on the top surface of said base and defining indicia to be inked and thereafter to apply an ink imprint to said surface of said object;

means forming a plurality of cylindrical recesses in said bottom surface of said base, said recesses extending through a major portion of the depth of said base, and being arranged in staggered rows wherein all lateral cross sections through said base parallel to the roll axis intersect at least one of said recesses, the area of the bottom surface of the base defined by the recesses being sufficient to accommodate substantial resilient flexure of the base in a direction normal to the surface of the roll;

whereby, when said type segment is flexed to conform to said cylindrical surface of said roll, distortion occurs primarily in the lower portion of said base to minimize distortion in said print face and when said print face is pressed by said printing roll against the surface of said object, irregularities in surface form will produce a minimum of force variation and thus a minimum of print distortion.

2. A type segment as defined in claim 1, wherein said recesses define at least 50% of the area of said bottom surface of said base.

3. A type segment as defined in claim 1, wherein said recesses define between 50 and 70% of the area of said bottom surface of said base.

*4. A type segment, comprising an elongated flexible base having a pair of generally flat top and bottom surfaces, said top surface defining indicia comprising:*

*a bar code strip comprising a plurality of raised, parallel members positioned substantially across the width of said top surface and having predetermined individual widths and spacings therebetween;*

*said bottom surface having means for reducing distortion of said individual widths of said members and spacings therebetween when said bottom surface of said type segment is pressed into lengthwise, conforming contact with a cylindrical surface of a printing roll; and*

*said reducing means comprising a plurality of recesses extending into said base a major portion of the depth thereof and extending substantially along the entire length of said indicia.*

*5. A type segment as defined in claim 4, wherein said plurality of recesses form a row which extends in the lengthwise direction of said base.*

*6. A type segment as defined in claim 4, wherein said recesses are arranged such that substantially all lateral cross sections through said base perpendicular to the lengthwise direction of said base intersect at least one of said recesses.*

*7. A type segment as defined in claim 4, wherein said recesses comprise at least about 50% of said bottom surface of said base.*

*8. A type segment as defined in claim 7, wherein said recesses comprise from about 50% to 70% of the area of said bottom surface of said base.*

*9. A type segment as defined in claim 4, wherein said plurality of recesses form a plurality of parallel rows which extend in the lengthwise direction of said base.*

*10. A type segment as defined in claim 9, wherein the recesses in each of said rows are staggered relative to recesses in adjacent rows.*

*11. A type segment as defined in claim 4, wherein said recesses are cylindrical in shape.*

*12. A type segment as defined in claim 4, wherein said recesses extend into said base approximately 90% of the total depth thereof.*

*13. A flexible type segment formed of elastomeric material in an initially flat condition, and adapted for mounting on the cylindrical surface of a printing roll that rotates about its central axis against the surface of an object to be marked comprising:*

*an elongated base having generally flat, parallel top and bottom surfaces, mountable on said roll with said bottom surface conforming to the cylindrical surface of the roll and extending longitudinally in a circumferential direction around the roll;*

*a raised print face formed on said top surface of said base and defining inkable indicia, including a bar code strip comprising a plurality of substantially parallel members having predetermined widths and spacings therebetween, said print face configured for applying an ink imprint of said parallel members to the surface of the object to be marked; and*

*said bottom surface of said base having a plurality of recesses therein, said recesses extending through a major portion of the depth of said base, and being arranged in a pattern wherein substantially all lateral cross sections through said base parallel to the lengthwise direction of said base intersect at least one of said recesses, the size and arrangement of said recesses being sufficient to accomodate substantially resilient flexure of said base in a direction normal to the surface of the printing roll and sufficient to reduce distortion of said widths and spacings between said members when said type segment is flexed to conform to the cylindrical surface of the printing roll.*

* * * * *